Sept. 19, 1950  B. F. PITCHER  2,522,799
CHAIN SAW SHARPENER
Filed June 15, 1949  2 Sheets-Sheet 1
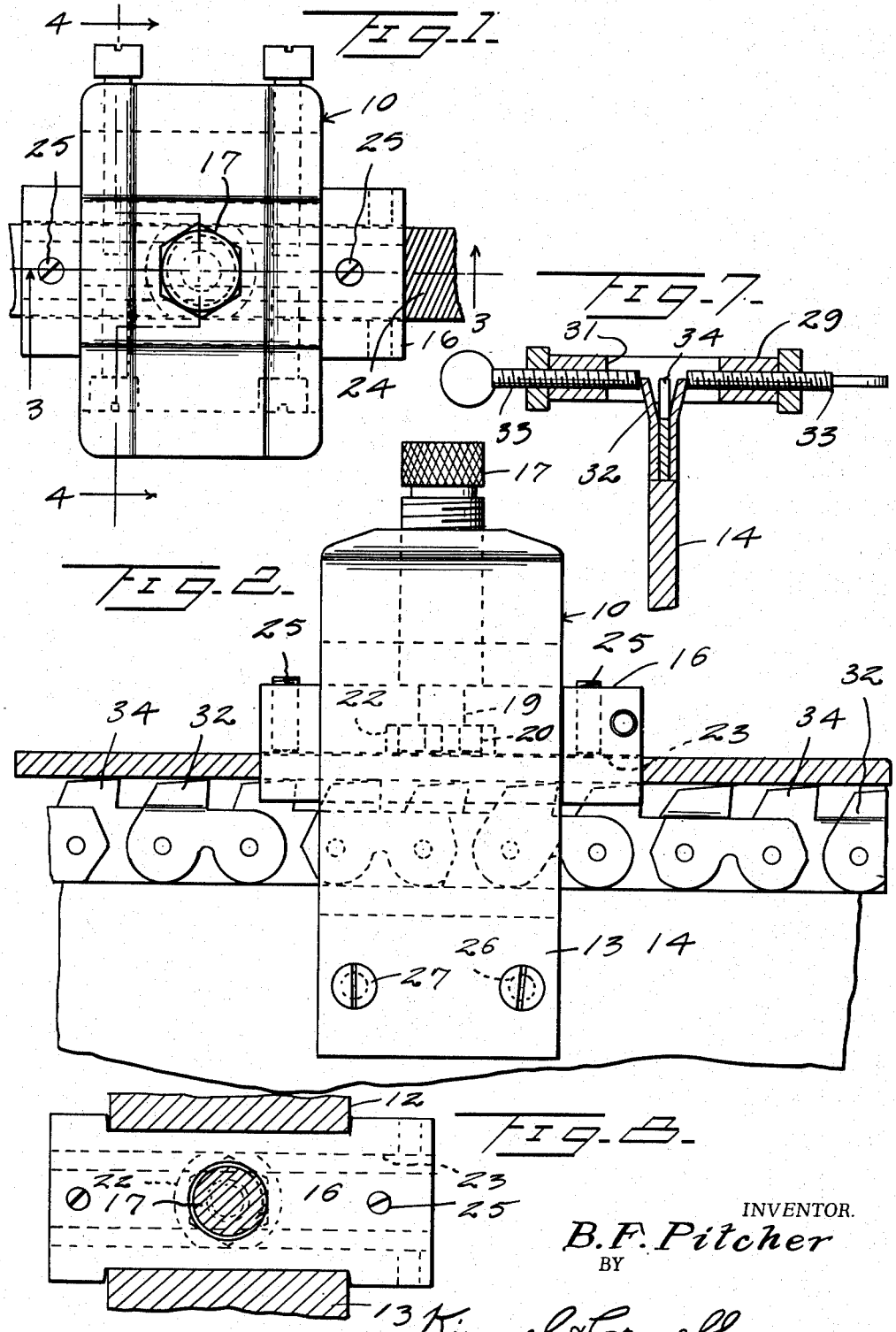
INVENTOR.
B. F. Pitcher
BY
Kimmel & Crowell  ATTORNEYS

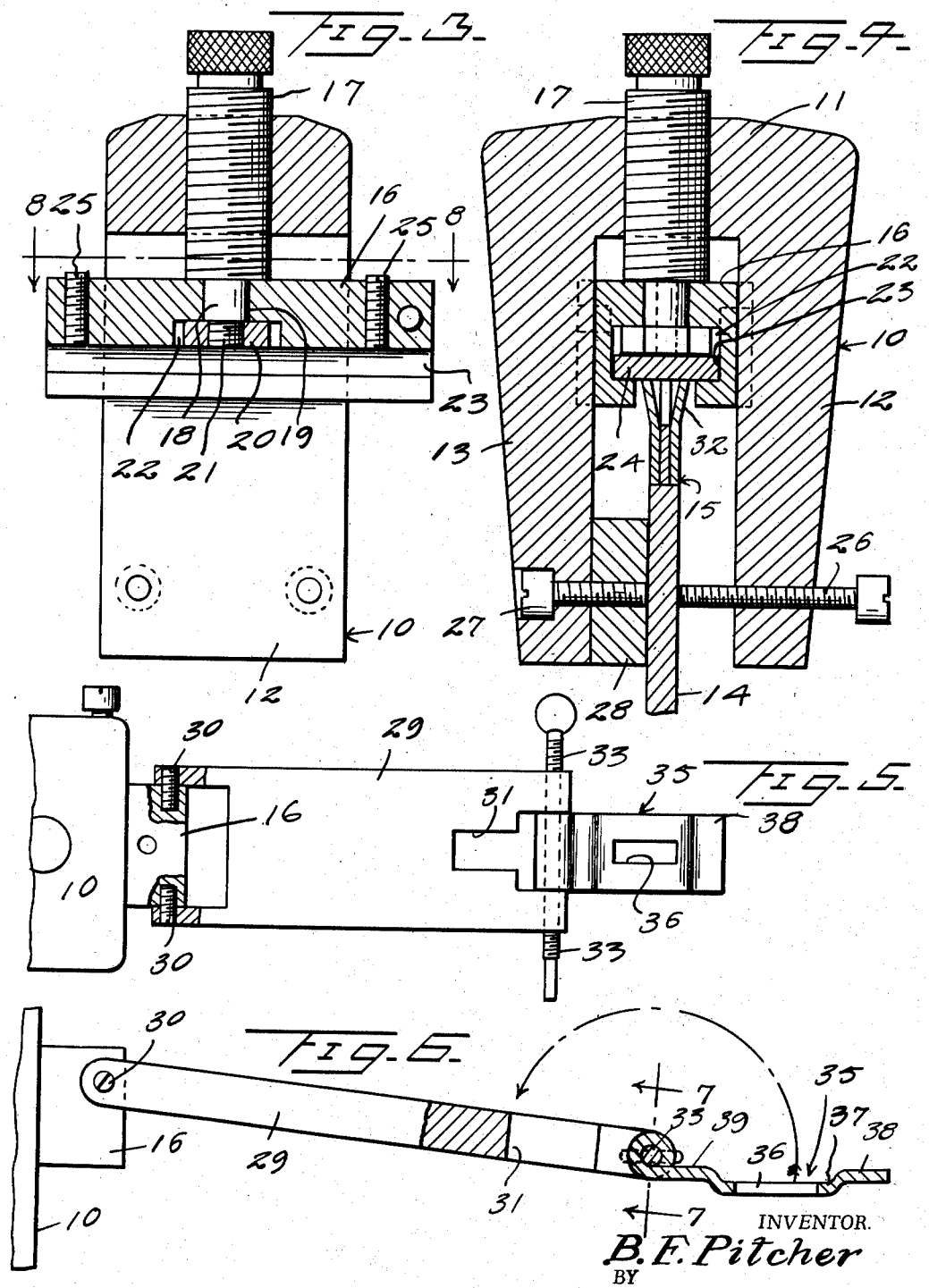

Patented Sept. 19, 1950

2,522,799

UNITED STATES PATENT OFFICE 2,522,799

CHAIN SAW SHARPENER

Benjamin F. Pitcher, Cheboygan, Mich.

Application June 15, 1949, Serial No. 99,197

2 Claims. (Cl. 76—47)

This invention relates to chain saw sharpeners.

An object of this invention is to provide a chain saw sharpener which will sharpen the saw while on the saw frame, and which will also permit setting and gauging of the teeth, including both the cutting and the raker teeth.

Another object of this invention is to provide a sharpener of this kind which includes a frame adapted to be clamped to the saw frame and guide, and an adjustable file carrier which is adjustable relative to the saw teeth so that the latter will be evenly sharpened along the tops thereof as the chain moves under the file, and the set of the teeth can be gauged so that the teeth can be accurately set.

A further object of this invention is to provide a device of this kind including an attachment whereby the raker teeth can be sharpened and also gauged.

A further object of this invention is to provide a device of this kind which is simple in construction and can be easily and quickly mounted on the saw structure without alteration of the latter.

With the above and other objects in view, my invention consists in the arrangement, combination and details of construction disclosed in the drawings and specification, and then more particularly pointed out in the appended claims.

In the drawings,

Figure 1 is a plan view of a device for use in sharpening and setting of chain saws, constructed according to an embodiment of this invention, Figure 2 is a detail side elevation of the device, Figure 3 is a sectional view taken on the line 3—3 of Figure 1, Figure 4 is a sectional view taken on the line 4—4 of Figure 1, Figure 5 is a plan view, partly broken away, of a raker tooth gauge and filing guide, Figure 6 is a detail side elevation, partly broken away and in section, of a raker tooth gauge and filing guide, Figure 7 is a sectional view taken on the line 7—7 of Figure 6, Figure 8 is a sectional view taken on the line 8—8 of Figure 3.

Referring to the drawings, the numeral 10 designates generally an inverted U-shaped frame embodying an upper bight 11 and parallel side members 12 and 13. The frame 10 is adapted to be secured to a fixed portion of a chain saw structure and preferably the chain guide 14 over which the chain 15 slidably engages.

The frame 10 has adjustably mounted between the sides 12 and 13 thereof a vertically slidable block 16 which is vertically adjusted by means of a screw 17 threaded through the bight 11 and formed with a reduced unthreaded stud 18 engaging through an opening 19 formed in the block 16. A nut 20 is threaded on a reduced diameter threaded stud 21 carried by the stud 18, and the nut 20 rotatably engages in the opening 22 formed in the block 16.

The block 16 is formed with a T-shaped channel 23 within which a file 24 is adapted to engage. The file 24 is secured in the channel 23 by means of set screws 25 so that the file 24 will be exposed on its lower side to the saw teeth of the chain saw 15. The frame 10 is clamped onto the stationary frame 14 by means of opposed clamping screws 26 and 27 which engage through the lower portions of the sides 12 and 13 and preferably a spacer block 28 is interposed between the side member 13 and the frame 14 so that the chain saw 15 will be positioned substantially through the center of the file 24.

A gauging bar 29 is pivotally mounted on the block 16, being pivotally secured thereto by screws 30. The bar 29 is formed at its forward end with a slot 31 through which the cutting teeth 32 of the saw are adapted to loosely engage, and opposed thumb screws 33 are threaded through the bar 29 and as shown in Figure 7, are adapted to bear against the cutting teeth 32 so that any of such teeth which are set too deep may be forced inwardly so that they will be in alignment with the adjacent and remaining teeth.

In order to provide a means whereby the raker teeth 34 of the chain saw 15 may be gauged and filed, I have provided a raker tooth gauge bar 35 which is adapted to be pivotally disposed on the screws 33. The raker gauge 35 is formed with a slot 36 within which a raker tooth is adapted to be positioned, and preferably the gauge member 35 is formed with a downwardly offset intermediate portion 37 forming a file guide whereby a file may be reciprocated in the cross channel formed by the offset portion 37.

The forward and rear portions 38 and 39 of the gauge member 35 are adapted to rest on the tops of the cutting teeth so that the raker tooth disposed between two pairs of cutting teeth may be accurately gauged and sharpened.

In the use and operation of this device the frame 10 is secured to the frame 14 by the clamping bolts 26 and 27. The file 24 is secured in the file channel 23 by the set screws 25 and the block 16 may then be vertically adjusted so that the file 24 will contact on its lower side with the cutting teeth of the saw. The chain is operated in the normal manner over the chain guide 14 and as the saw teeth pass beneath the file they will be sharpened by the file.

Where is is desired to gauge the cutting teeth, the bar 29 is mounted on the forward end of block 16 and the chain saw is then slowly moved through the slot 31 and the teeth of the saw adjusted by the setting screws 32. After the cutting teeth have been properly set, the raker teeth may be sharpened by mounting the raker tooth gauge and file guide 35 on the bolts or screws 33. The file used in sharpening the raker teeth is reciprocated cross-wise of the length of the chain saw within the channel formed by the offset portion 37. As the upper side of the offset portion 37 is coplanar with the lower sides of the end portions 38 and 39, the raker teeth may be filed to a point where they are flush with the upper surface of the offset portion 37.

I do not mean to confine myself to the exact details of construction herein disclosed, but claim all variations falling within the purview of the appended claims.

What I claim is:

1. A chain saw sharpener comprising an inverted U-shaped frame, clamping means securing said frame to the saw frame with the bight of the U-frame engaging over the saw frame, a vertically adjustable block engaging between the arms of said U-frame, said block having a T-shaped channel opening through the lower side thereof, a block adjusting screw threaded through the bight of said U-frame, a swivel connection between said screw and said block, means securing a file in said T-shaped channel whereby the saw teeth will engage the lower side of the file, and a gauge means extending from the forward side of said U-frame, said gauge means comprising an elongated bar, means pivotally securing one end of said bar to said U-frame, the opposite end of said bar having a rearwardly extending slot, and a pair of confronting screws threaded into said bar one on each side of said slot.

2. A chain saw sharpener comprising an inverted U-shaped frame, clamping means securing said frame to the saw frame with the bight of the U-frame engaging over the saw frame, a vertically adjustable block engaging between the arms of said U-frame, said block having a T-shaped channel opening through the lower side thereof, a block adjusting screw threaded through the bight of said U-frame, a swivel connection between said screw and said block, means securing a file in said T-shaped channel whereby the saw teeth will engage the lower side of the file, a gauge means extending from the forward side of said U-frame, said gauge means comprising an elongated bar, means pivotally securing one end of said bar to said U-frame, the opposite end of said bar having a rearwardly extending slot, a pair of confronting screws threaded into said bar one on each side of said slot, said gauge means also including a combined raker tooth gauge and file guide and formed of a flat bar pivoted on said pair of screws, said flat bar having an intermediate offset portion forming an upper cross channel, said offset portion having an elongated opening through which the raker tooth is adapted to project, the upper side of said offset portion being in the same plane as the lower side of said flat bar adjacent said offset portion.

BENJAMIN F. PITCHER.

REFERENCES CITED

The following references are of record in the file of this patent:

UNITED STATES PATENTS

| Number | Name | Date |
| --- | --- | --- |
| 314,040 | Mayer | Mar. 17, 1885 |
| 2,339,509 | Olson | Jan. 18, 1944 |
| 2,415,137 | Johnson | Feb. 4, 1947 |